Jan. 19, 1926.  
E. C. PITMAN  
1,570,079  
NONSTATIC FILM AND BACKING SOLUTION FOR USE IN MAKING THE SAME  
Filed Sept. 16, 1920
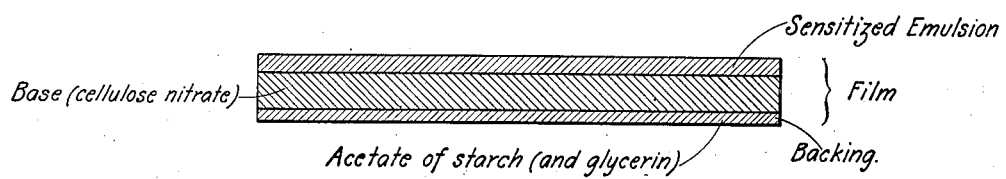
E. C. Pitman, Inventor
By his attorney Patented Jan. 19, 1926.

1,570,079

UNITED STATES PATENT OFFICE.

EARLE C. PITMAN, OF PARLIN, NEW JERSEY, ASSIGNOR TO E. I. DU PONT DE NEMOURS & COMPANY, OF WILMINGTON, DELAWARE, A CORPORATION OF DELAWARE.

NONSTATIC FILM AND BACKING SOLUTION FOR USE IN MAKING THE SAME.

Application filed September 16, 1920. Serial No. 410,749.

*To all whom it may concern:*

Be it known that I, EARLE C. PITMAN, a citizen of the United States, and a resident of Parlin, in the county of Middlesex and State of New Jersey, have invented a certain new and useful Nonstatic Film and Backing Solution for Use in Making the Same, of which the following is a specification.

This invention relates to photographic films having provisions for the elimination of discharges of static electricity. With the ordinary film these discharges occur when the film is stripped from the casting surface, when it is run rapidly through a cinematographic camera and under various other circumstances. Such discharges cause markings on the sensitized emulsion by premature exposure thereof. One object of the invention is to provide a film which, for practical purposes of manufacture and use, will be free from static electricity. Another object is to provide a backing solution for use in the manufacture of films of the type mentioned. It is also an object to improve generally upon films and solutions of the character indicated.

For convenience and brevity of description I use the term "film" to denote the entire article, whether or not the article includes a sensitized emulsion; the term "backing" to denote a layer of a composite film which lies adjacent the other side of the film from the emulsion side; and I use the term "base" to denote that portion of a composite film which is intended to carry the backing at one side and the emulsion at the other and to form or include the principal strength giving portion of the film.

In the accompanying drawing I have, without restricting my invention thereto, shown a film embodying my invention, the view being a conventional, exaggerated, cross-sectional showing.

According to my invention, as preferably practiced, I apply to any suitable base, for example a base of cellulose acetate or cellulose nitrate, preferably the latter, a backing of starch acetate. I have found that this carbohydrate ester is more conductive, and more hygroscopic, than any of the materials commonly used for the bases of films, and that the application of a backing of starch acetate gives a film that is of superior conductivity and is substantially "non-static".

Preferably, I use a starch acetate that is soluble in hot water and have found satisfactory the commercial product known as "Feculose". For a backing solution containing starch acetate of this general character the following formula may be used—all parts given are by weight.

| (1) | Approximate range. | Preferred. |
|---|---|---|
| Starch acetate | 1 to 8 | 5 |
| Glycerine | 1.25 to 15 | 5 |
| Denatured alcohol | 1 to 8 | 3 |
| Water | 10 to 60 | 40 |

In making this up dissolve the starch acetate in the (boiling) water, and add (a) the glycerine, and (b) the alcohol, in order. The alcohol is desirably 95% ethyl alcohol and 5% suitable denaturant. It is to be understood that I do not restrict my invention to the example given.

While a backing of the present invention may be of any suitable thickness serving the ends sought, I have found a relatively thin backing desirable. As noted above, the backing may desirably be applied to a base of cellulose nitrate; for such a base any suitable formula may be used, the following, wherein parts are by weight, being satisfactory:—

| (2) | Approximate range. | Preferred. |
|---|---|---|
| Cellulose nitrate (dry) | 25- 50 | 35 |
| Camphor | 2- 6 | 4 |
| Wood alcohol | 90-150 | 120 |
| Acetone | 10- 50 | 20 |
| Fusel oil | 20- 50 | 40 |
| Amyl acetate | 10- 30 | 20 |

The mechanical operations of making films in accordance with my invention will be evident to those skilled in the art, the casting of films, and similar operations, as such, being of course well known in the art. The backing solution may be applied, and the solvents evaporated, to give the backing, in any convenient manner.

While, in describing my invention, I have referred to it as embodied in a "backing" it is to be understood that by this term I do not exclude films wherein the pellicle which more particularly exemplifies the invention, may have applied to its (normally) exposed surface a coating of such character as not to destroy the efficacy of the pellicle, the pellicle, from the standpoint of the present invention, yet being a "backing."

I claim:

1. A photographic film comprising acetate of starch.

2. A photographic film including a sensitized emulsion and a support therefor, such support comprising acetate of starch.

3. A photographic film comprising acetate of starch and glycerine.

4. A photographic film including a sensitized emulsion and a support therefor, such support comprising acetate of starch and glycerine.

5. A photographic film having a base, and a backing of acetate of starch.

6. A photographic film having a base, and a backing of acetate of starch and containing glycerine.

7. A photographic film having a base of cellulose ester, and a backing of acetate of starch.

8. A photographic film having a base of cellulose nitrate, and a backing of acetate of starch.

9. A photographic film having a base, and a backing comprising 1 to 8 parts of acetate of starch and 1.25 to 15 parts of glycerine.

10. A photographic film having a base, and a backing comprising 5 parts of acetate of starch, and 1 part of glycerine.

11. A backing solution for films containing acetate of starch, alcohol, and a solvent.

12. A backing solution for films containing acetate of starch, alcohol, glycerine, and a solvent.

13. A backing solution for films containing 1 to 8 parts of water-soluble acetate of starch, 1.25 to 15 parts of glycerine, 1 to 8 parts of alcohol, and 10 to 60 parts of water, by weight.

14. A backing solution for films containing 5 parts of water-soluble acetate of starch, 5 parts of glycerine, 3 parts of alcohol, and 40 parts of water, by weight.

In testimony whereof I affix my signature.

EARLE C. PITMAN.